(12) United States Patent
Günther

(10) Patent No.: US 7,076,855 B2
(45) Date of Patent: Jul. 18, 2006

(54) METHOD OF MANUFACTURING A RACK-AND-PINION STEERING HOUSING

(75) Inventor: Friedhelm Günther, Dortmund (DE)

(73) Assignee: SchmitterChassis GmbH, Drensteinfurt (DE)

( * ) Notice: Subject to any disclaimer, the term of this patent is extended or adjusted under 35 U.S.C. 154(b) by 365 days.

(21) Appl. No.: 10/332,212

(22) PCT Filed: Jul. 4, 2001

(86) PCT No.: PCT/DE01/02411
§ 371 (c)(1),
(2), (4) Date: May 9, 2003

(87) PCT Pub. No.: WO02/04141
PCT Pub. Date: Jan. 17, 2002

(65) Prior Publication Data
US 2003/0167619 A1 Sep. 11, 2003

(51) Int. Cl.
*B21D 39/00* (2006.01)

(52) U.S. Cl. .................. 29/522.1; 29/525; 29/505; 29/506; 29/512; 29/421.1; 180/428; 403/282

(58) Field of Classification Search ............... 29/522.1, 29/525, 505, 421.1, 506, 512; 180/428; 280/93.514, 280/93.515; 285/382, 382.4, 286.2, 288.1; 403/280, 282; 301/124.1, 125, 7, 8, 9, 9.1, 301/9.2
See application file for complete search history.

(56) References Cited

U.S. PATENT DOCUMENTS

| | | | | |
|---|---|---|---|---|
| 3,739,460 A | * | 6/1973 | Addis et al. ................... | 29/516 |
| 4,419,804 A | * | 12/1983 | Axthammer ................. | 29/434 |
| 5,177,854 A | * | 1/1993 | Herbert et al. ........... | 29/407.08 |
| 6,148,581 A | * | 11/2000 | Separautzki ................ | 52/653.2 |
| 6,209,183 B1 | * | 4/2001 | Bugosh ....................... | 29/280 |

FOREIGN PATENT DOCUMENTS

| | | | |
|---|---|---|---|
| DE | 4201730 A1 | * | 7/1993 |
| DE | 4237485 A1 | * | 5/1994 |
| DE | WO 99/255506 | * | 5/1999 |

\* cited by examiner

*Primary Examiner*—George Nguyen
*Assistant Examiner*—Sarang Afzali
(74) *Attorney, Agent, or Firm*—Pandiscio & Pandiscio

(57) ABSTRACT

A method for manufacturing a rack-and-pinion steering housing for transmission of steering force including the steps of pressing steering rod guide elements axially into open end regions of a tubular steering housing, and axially pressing the elements into the tubular housing to radially expand the housing end regions.

14 Claims, 5 Drawing Sheets

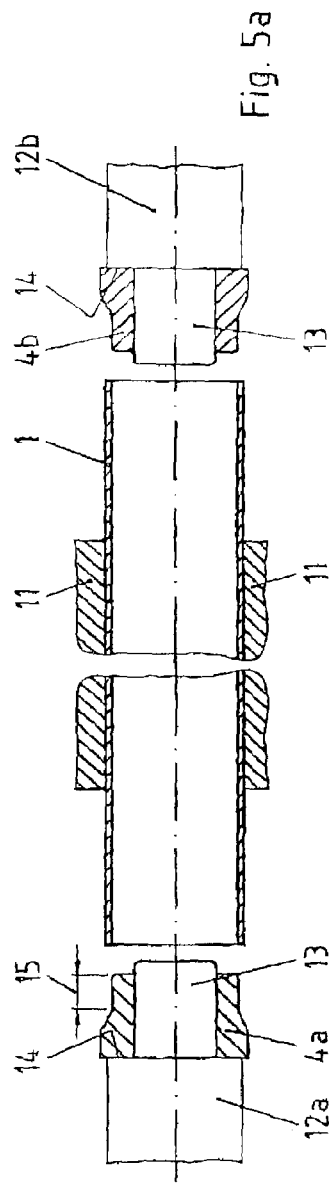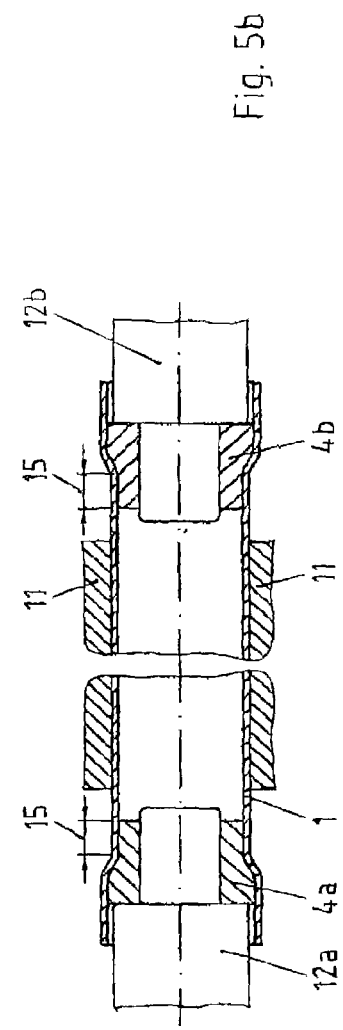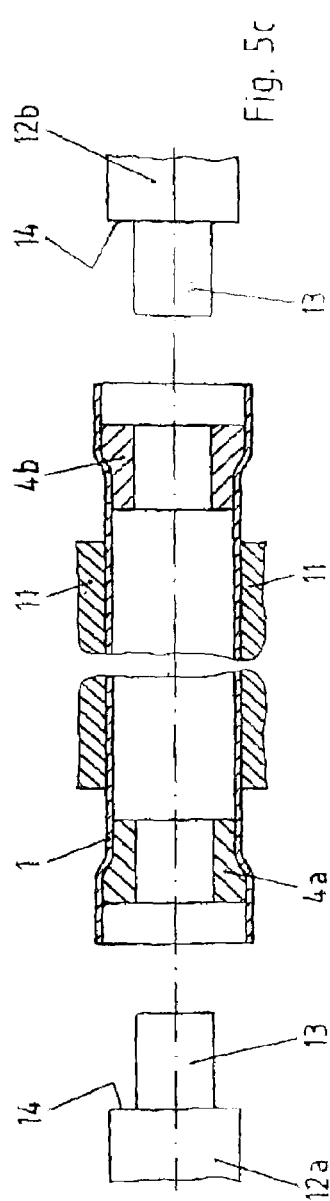

METHOD OF MANUFACTURING A RACK-AND-PINION STEERING HOUSING

BACKGROUND OF THE INVENTION

1. Field of the Invention

The invention relates to a method of manufacturing a rack-and-pinion steering housing and to a device, press unit and steering rod guide element suitable for carrying out the method.

2. Description of the Prior Art

Rack-and-pinion steerings are used inside the chassis of a motor vehicle in order to convert the rotary steering motion applied via the steering rod into a rectilinear motion for pivoting the vehicle wheels to be steered. In order to support the steering power, a servo-mechanism is used, which can be disposed at various sites inside the steering power flow.

A rack-and-pinion steering of the type of interest here can be deduced from the prospectus "Die elektrische Servolenkung" ("The electric power steering") (ZF Friedrichshafen AG, imprint no. G 7802 P-MBA 2/98 d). The rack-and-pinion steering has a tubular rack-and-pinion steering housing which surrounds the internal rack protectively. On the rack-and-pinion steering housing, a pinion meshing region is provided, via which a pinion unit transmits the rotary motion generated at the steering wheel into the rack-and-pinion steering. A pinion of the pinion unit meshes in the splining of the internal rack in order to convert the rotary motion into a rectilinear motion. The reciprocating motion of the rack to be generated thereby is to be tapped via steering rods passing out of the end of the rack-and-pinion steering housing, which steering rods are in turn coupled to a respective wheel for steering. According to the class of vehicle, an electric servo-mechanism supporting the steering motion can either be incorporated into the steering column or disposed on the pinion or act on the rack. In the latter case, the rack steering housing is accordingly modified at one end region.

The known rack-and-pinion steering housing consists of aluminium and is manufactured by pressure casting. After casting, a cutting operation is necessary in order to be able to assemble attachments, such as the pinion unit for example, to the rack steering housing. The cutting operation extends to the milling of contact faces for the parts to be assembled and the formation of bottom and through-bores for fixing, which are partly further machined by tapping.

From DE 42 37 485 A1, a rack helper steering is known, in which in a steering housing a pinion is rotatably mounted and a rack guided thereby is displaceable. A tubular cylinder of a servo-motor is rigidly connected to the steering housing. Integral with the cylinder are outward-projecting annular collars formed by a high-pressure reshaping process. Furthermore, in the pinion meshing region a lower bearing support for ball bearings is formed.

Internal high-pressure reshaping is also used in a known method with a device for manufacturing an integral housing for a hydraulic steering gear (DE 197 51 408 A1). This has a housing section for receiving a steering gear having a rack and pinion part and an adjoining housing section for disposing the hydraulic steering support. With the internal high-pressure reshaping process, a spherical convexity is formed. After removal of the reshaped part from a die, further small reshapings are carried out such as e.g. the moulding on of a bead and then a mechanical finishing operation. However, the latter is not described in more detail.

A generic housing for a hydraulic power steering is known from DE 42 01 730 A1. In a pinion region a plurality of recesses are formed which are partly flush with one another. They receive a steering shaft, which is rigidly connected to a steering wheel. The recesses are formed by drilling in order to set a screw for the contact pressure of a pressure member. The entire housing is likewise produced in the internal high-pressure process, one housing end being shown with a widening whose function is not explained.

SUMMARY OF THE INVENTION

The object of the present invention is to create a method and device for manufacturing a rack-and-pinion steering housing which simplifies manufacture whilst shortening the manufacturing time and reducing the number of steps required for manufacture.

This is achieved according to the invention by the method indicated in claim 1 and by the appropriate means according to other independent claims. Further advantageous embodiments will appear from the dependent claims.

The invention includes the teaching of a method whereby, using internal high-pressure reshaping (IHU) first a tubular starting material of steel is subjected to an internal pressure inside a reshaping die for complete contour shaping of the rack-and-pinion steering housing. Directly afterwards, piston rod guide elements are pressed into both end regions of the rack-and-pinion steering housing in order to expand them. According to the requirement, thereafter in order to manufacture the pinion meshing region on the rack-and-pinion steering housing a fit through-bore is formed on the rack-and-pinion steering housing. Finally, coaxially to the fit through-bore, a lower bearing support and a mounting plane for the pinion unit can be welded on.

The method according to the invention has the advantage of manufacturing rack-and-pinion steering housings in a few steps, wherein cutting machining is only restricted to the formation of the fit through-bore. In order to join mounting parts, as far as possible, instead of conventional screw fixings, the welding method is used, which is in this case possible by using steel as a starting material. In order to guide the steering rods in the outlet region at both ends of the rack-and-pinion steering housing, separate press-in bushes are provided, which in a single operation during pressing in at the same time expand the two end regions of the rack-and-pinion steering housing and thereby form a firm seat for bellows elements to be mounted thereon as dirt protectors.

In addition it is also possible to process the expanded ends of the rack-and-pinion steering housing if necessary by a further reshaping step or by a cutting operation in order to ensure connection to the bellows elements mounted thereon.

The above-mentioned guide elements have the function of guiding the piston rod or steering rod direct. To this end, clip-on plastics guide bushes can be used. A further function of the guide elements is to form a mechanical permanent stop of the steering known as a "lockstop".

With particular advantage, the method according to the invention takes place in two stages in that the steering rod guide elements are first preferably inserted with little force axially into the tubular housing and then in the second stage are axially pressed into the tube interior with full force in order to expand the two housing end regions, preferably in the radial direction.

According to a preferred embodiment of the invention, expansion takes place over the axial or axially parallel longitudinal extension of the housing end regions, in that the end regions are expanded to different widths or inner diameters. In this case, the larger of the two widths or inner diameters is closer than the smaller to the housing end face in the fully inserted state. By this gradation, passing along the housing into the housing interior, there is a stepped tapering for the housing end region, which can perform a centring function if the bellows elements are added later for example.

Particularly in the use of a hydraulic steering, it is required that the steering rod guide elements can at least no longer come out of the interior of the housing end regions. This is countered by an embodiment of the invention whereby, after pressing in, locking elements are so formed that the steering rod guide elements are fixed to an abutting housing inside wall at least in or opposite to the direction of release or withdrawal.

Preferably, the bearing support and the mounting plane are welded on by the method of laser welding. Thereby any heat distortion between the bearing support and the rack-and-pinion steering housing and/or the rack-and-pinion steering housing and the mounting plane can be avoided. At this site, a precisely coaxial relative position of the connected parts is necessary in order to ensure exact meshing of the pinion in the splining of the rack.

In order to fix the rack-and-pinion steering housing to the chassis of a vehicle, preferably a U-shaped holding plate produced by bending can be welded to at least one end of the rack-and-pinion steering housing. The use of a U-shaped bent holding plate, whose two flanges are welded to the rack-and-pinion steering housing, is a simple and reliable fixing option of the steel-tubular rack-and-pinion steering housing formed by internal high-pressure reshaping.

In order to obtain additional corrosion protection for the rack-and-pinion steering housing, this can be treated with a coating, e.g provided with a varnish or galvanically treated.

The method according to the invention for manufacturing the rack-and-pinion steering housing can be carried out preferably by means of a device which comprises a reshaping die unit, which is divided for the first step in terms of internal high-pressure reshaping and which contains a negative contour of the rack-and-pinion steering housing. Connected in series are a pressing unit and optionally a milling unit and finally a welding unit.

Within the scope of the general inventive notion is also a pressing unit taken per se, which is suitable for use in the device according to the invention and which is characterised by two insertion or pressing rams which can be positioned according to the spacing of the end or expansion regions. These are guided adjustably relative to one another and formed with a cylindrical basic shape which has a stepped outer diameter. Thereby an annular stop shoulder is formed, by means of which the steering rod guide elements can be pressed into the housing interior.

Within the scope of the general inventive notion is also a steering rod guide element, which is formed specifically for use in the method according to the invention or the device according to the invention and has an annular and/or hollow cylindrical basic shape. This is characterised by a first rear section of larger outer diameter which performs the significant expansion of the housing end region. A subsequent second front section has a smaller diameter, but this is slightly larger than the inner diameter of the housing end regions to be expanded. This gives the advantage of centring during insertion and pressing in of the ram when the steering rod guide element is mounted.

Further details, features, advantages and effects based on the invention will appear from the following description of preferred embodiments of the invention and from the drawings, which show:

DESCRIPTION OF THE PREFERRED EMBODIMENT

Figure 1:
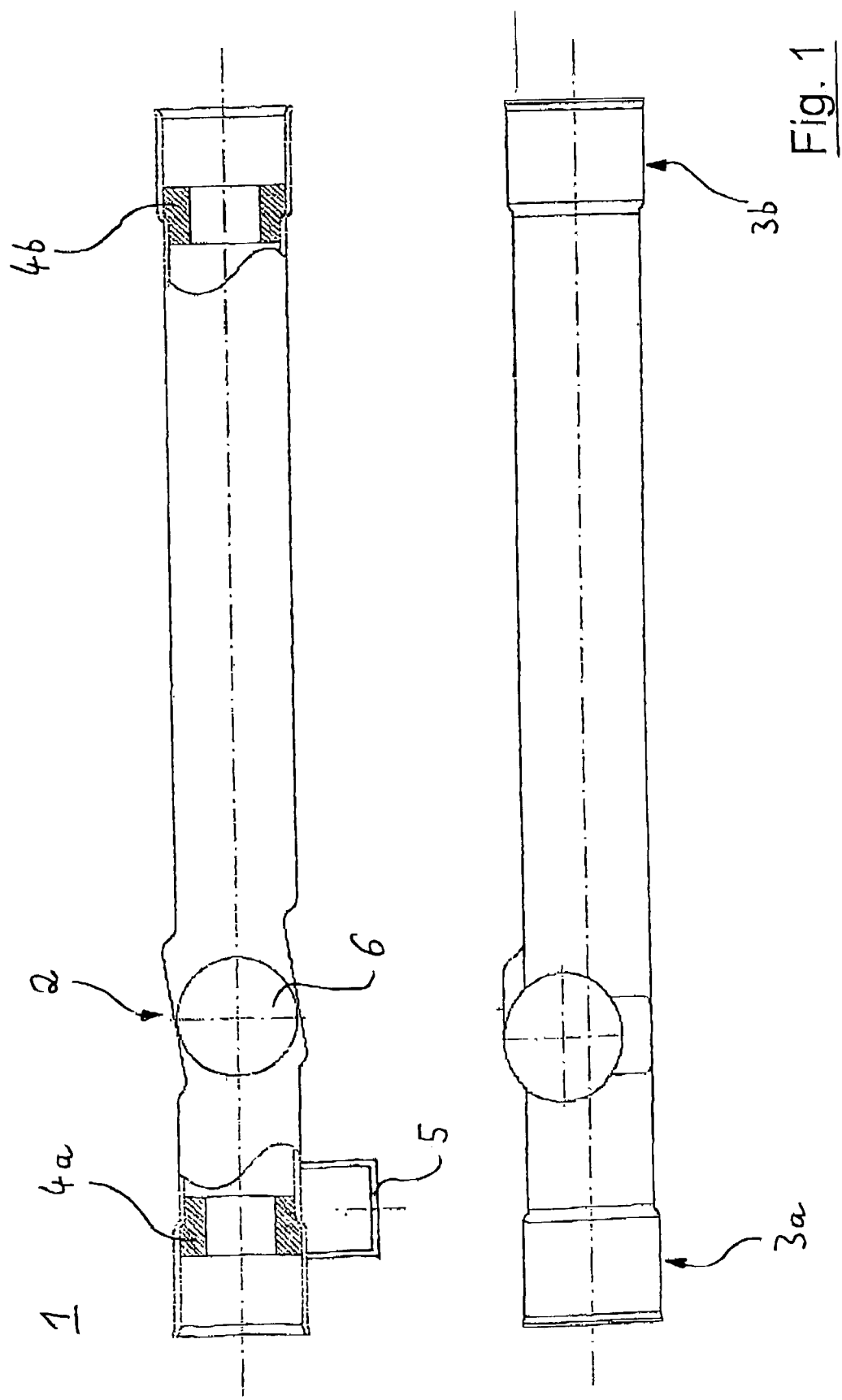
FIG. 1 a rack-and-pinion steering housing manufactured according to the invention in two longitudinal views at different angles of rotation, FIG. 2 a section in the longitudinal direction through the rack-and-pinion steering housing in the region of the fit through-bore, FIG. 3 alternative contour formations adapted to the particular applications of the rack-and-pinion steering housing, in a longitudinal view, FIG. 4 a schematic flow chart of the individual steps in the process of manufacturing the rack-and-pinion steering housing, FIG. 5a viewed in longitudinal section through the rack-and-pinion steering housing, a first stage in the method for the expanding pressing in of steering rod guide elements, FIGS. 5b, 5c in corresponding views a second and third stage in the above-mentioned step in the method, FIGS. 6, 7 respectively in longitudinal halt-section, different types of engagement between the steering rod guide element and the housing inner wall.

The rack-and-pinion steering housing 1 according to FIG. 1 to be produced by the manufacturing method claimed has a cylindrical basic shape. The cylindrical basic shape of the rack-and-pinion steering housing 1 is interrupted by a pinion meshing region 2. At the pinion meshing region 2, a pinion unit not shown here is used for longitudinal motion of a rack (not shown either) extending inside the rack-and-pinion steering housing 1. The steel rack-and-pinion steering housing 1 has two end expansion regions 3a and 3b. Inside the expansion regions 3a and 3b is a respective steering rod guide element 4a and 4b. Furthermore, in an end region of the rack-and-pinion steering housing a U-shaped holding plate 5 is mounted. The holding plate 5 makes it possible to fix the rack-and-pinion steering housing 1 to a chassis of a vehicle not shown here. The holding plate 5 is connected to the rack-and-pinion steering housing 1 by welding. In the pinion meshing region 2 of the rack-and-pinion steering housing 1 is a fit through-bore 6.

Figure 2:
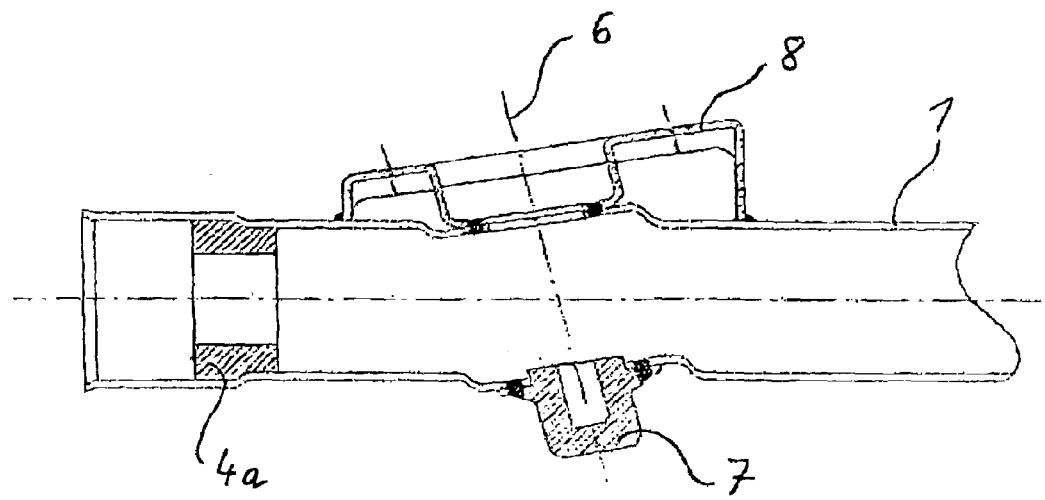

The fit through-bore 6 shown in detail in FIG. 2 extends obliquely to the longitudinal axis of the rack-and-pinion steering housing 1. Coaxially to the fit through-bore 6 a lower bearing support 7 and an upper mounting plane 8 are fixed by welding. As is shown, the weld joints lie directly in the region of the fit through-bores 6 in this case. The upper mounting plane 8 is fixed with additional welds to the rack-and-pinion steering housing 1. The lower bearing support 7 acts as a seat for a needle bearing, in which the shaft of the pinion (not shown) of the pinion unit is disposed. The pinion unit is fixable by screwing to the upper mounting plane 8.

Figure 3:
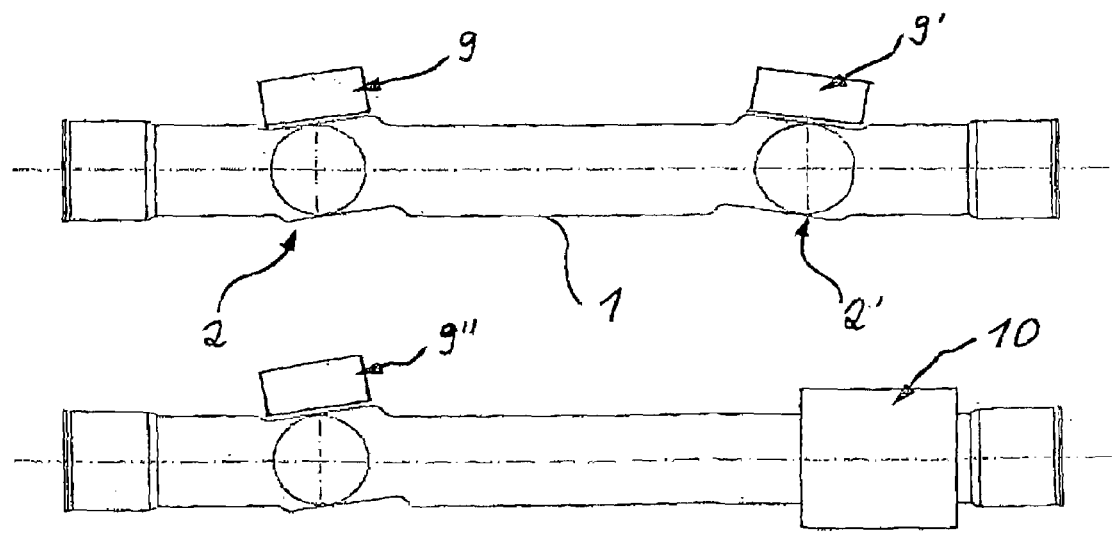

According to FIG. 3, a pinion unit 9 and 9' can also be fixed to two pinion meshing regions 2 and 2'. Thereby a split power application to the internal rack is possible. According to a further (shown below) modified embodiment, the rack-and-pinion steering housing 1 can also be provided with a servo-unit 10 in addition to a-pinion unit 9". The servo-unit 10 is in this case formed as a recirculating ball gear for steering support for heavy vehicles. The method according to the invention also admits other modifications of the rack-and-pinion steering housing 1.

Figure 4:
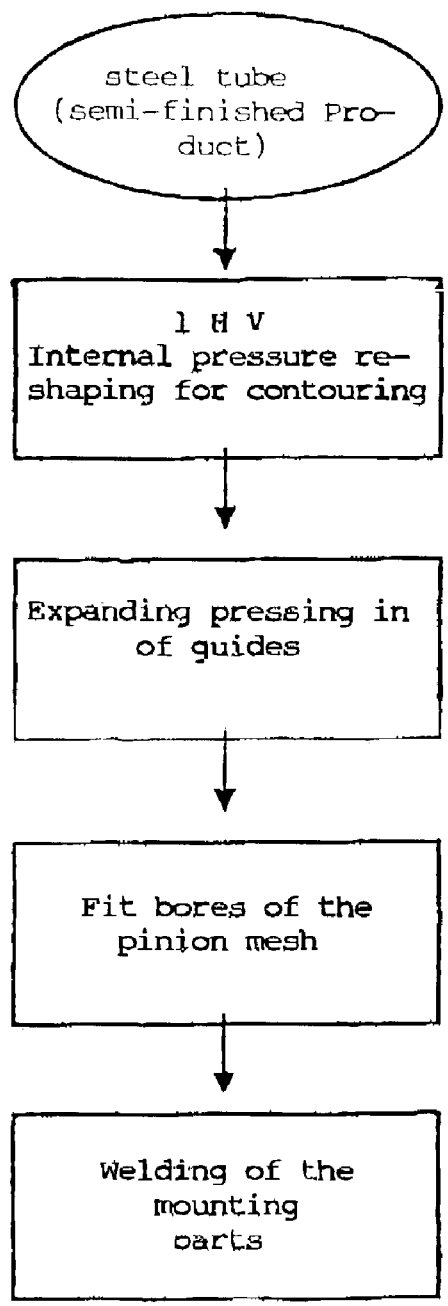

The rack-and-pinion steering housing is manufactured according to the invention by the method illustrated in FIG. 4. Starting from a reshapable steel tube as a semi-finished product, in a first step an internal high-pressure reshaping is carried out inside a divided reshaping die unit. Even at this stage, a complete contour shaping of the rack-and-pinion steering housing 1 is achieved. Thereupon, in a combined step, expanding pressing of the steering rod guide elements 4a and 4b into the two end regions 3a, 3b of the rack-and-pinion steering housing 1 is effected. Simultaneously with pressing in, the end regions are expanded, so that on the one hand a reliable press connection is obtained between the steering rod guide elements 4a and 4b and the rack-and-pinion steering housing 1 is achieved and on the other hand a seat for the bellows element to be mounted on the end of the rack-and-pinion steering housing is formed. After the expanding pressing operation by the steering rod guide elements 4a and 4b, a fit through-bore 6 for producing the pinion meshing region 2 is formed on the rack-and-pinion steering housing 1. Finally, the lower bearing support 7 and the upper mounting plane 8 are welded on coaxially to the fit through-bore 6. Optionally, further steps, such as coating, can be carried out.

According to FIG. 5a, the tubular steering housing 1 is held between two clamping jaws 11. Opposite a respective housing end, two pressing rams 12a, 12b are positioned ready. These each have a support pin 13 projecting relative to the steering housing 1, which pin has a smaller diameter than the rest of the ram base body, so that an annular stop or support shoulder 14 is formed respectively. On the support pin 13, a respective annular or hollow cylindrical steering rod guide element 4a, 4b is mounted and supported by the stop shoulder 14. Thus the support pin 13 and the stop shoulder 14 can act together as a seat and support for the respective steering rod guide element 4a, 4b during the pressing operation, in order to retain a predetermined fit for the inner diameter of the steering rod guide elements 4a, 4b.

According to FIG. 5, in a further stage of the method, which is independent per se, of "expanding and pressing in of steering rod guides", the respective guide element 4a, 4b is pressed in so as to bring about expansion. The latter each have a starting section 15 of reduced diameter, which only slightly expands the steering housing 1. This section 15 primarily forms a centring section, in order to achieve good coaxiality. The pressing rams 12a, 12b have been moved together as shown in the stage according to FIG. 5b.

According to FIG. 5c, the two pressing rams have been moved back out of the steering housing 1. The guide elements 4a, 4b have respectively remained inside the steering housing 1. The clamping jaws 11 can then be opened or moved apart. Then the tube expanded at its ends with pressed-in guide elements 4a, 4b can be removed from the manufacturing device or tool.

Figure 6:
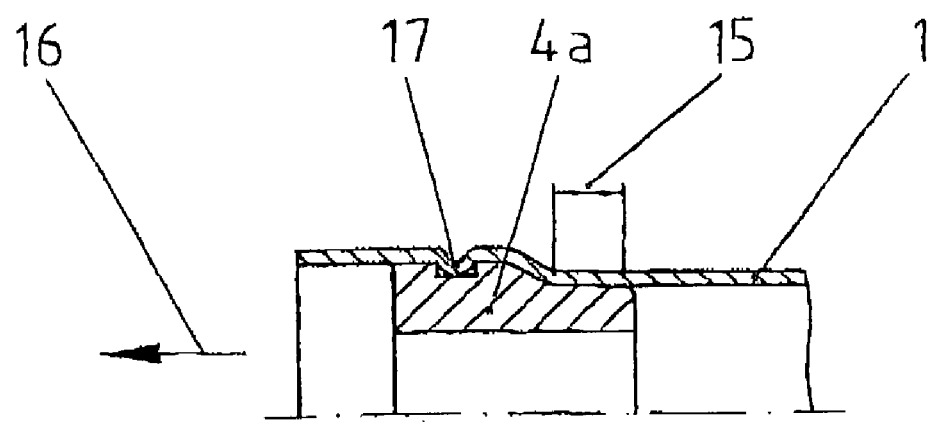
Figure 7:
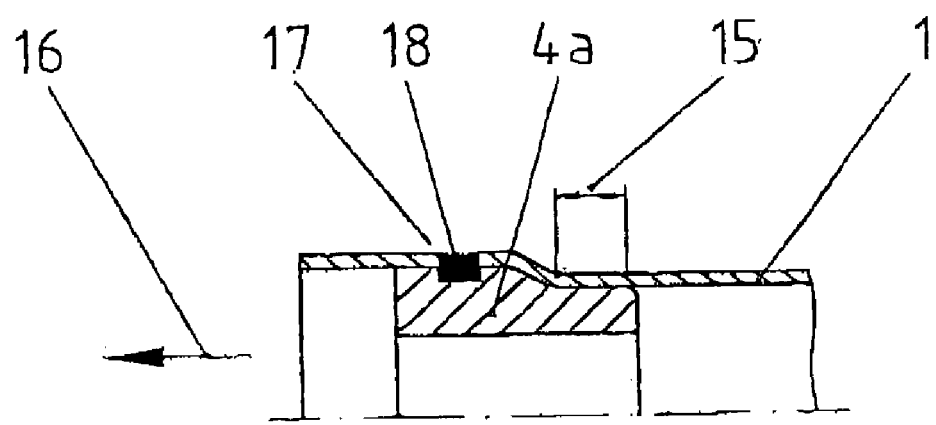

Especially where a hydraulic steering is used, mechanical locking or fixing of the guide elements 4a, 4b is recommended at least in the direction opposite to the pressing out direction 16. To this end, according to FIG. 6, the steering rod guide elements 4a and/or 4b are meshed together, e.g. caulked with the housing inner wall. The latter can be generated continuously or by individual pressure points from the outside by means of a multiple spherical head punch. Thereby, a plastically deformed stop 17 of steering housing inner wall and guide element outer wall against one another is achieved. According to FIG. 7, such a stop 17 can be realised by a weld 18 generated by laser for example.

LIST OF REFERENCES 1 rack-and-pinion steering housing
2, 2' pinion meshing region
3a, 3b expanding end regions
4a, 4b steering rod guide elements
5 U-shaped holding plate
6 fit through-bore
7 lower bearing support
8 upper mounting plane
9, 9' pinion unit
10 servo-unit
11 clamping jaws
12a, 12b pressing ram
13 support pin
14 stop shoulder
15 centring section
16 pressing out direction
17 stop
18 weld

The invention claimed is:

1. A method of manufacturing a rack-and-pinion steering housing which surrounds a rack for transmission of the steering force and has at least one pinion meshing region via which a pinion unit can be applied to the longitudinal motion of the rack, starting from a steel tubular workpiece, which is processed by means of internal pressure reshaping inside a reshaping die for contour shaping of the rack-and-pinion steering housing and pressing steering rod guide elements into both open end regions of the rack-and-pinion steering housing, and
  simultaneously with the pressing in, expanding the two end regions.

2. A method according to claim 1, characterised by the formation of a fit through-bore for manufacture of the pinion meshing region.

3. A method according to claim 2, characterised by welding on of a lower bearing support and of an upper mounting plane in the pinion meshing region coaxial to the fit through-bore.

4. A method according to claim 3, wherein the welding on of the bearing support and of the mounting plane is effected by laser welding in order to avoid heat distortion of parts fixed relative to one another.

5. A method according to claim 3, wherein the rack-and-pinion steering housing with the mounted bearing support and the mounting plane is provided with a coating in order to give corrosion protection.

6. A method according to claim 1, wherein the two end regions are further processed into bellows seats by reshaping or cutting, in order to create a reliable join with the bellows elements mounted thereon.

7. A method according to claim 1, characterised in that before pressing, axial insertion of the steering rod guide elements is effected.

8. A method according to claim 1, wherein expansion of the two end regions is effected in the radial direction relative to a central axis of the housing.

9. A method according to claim 1, characterised by the use of rams which move relative to one another for carrying, inserting and/or pressing of the steering rod guide elements into the end regions.

10. A method according to claim 1, characterised by widening effected in two stages in an axially offset manner with different widths or inner diameters for the end regions, the widths or inner diameters which are larger being closer to the housing end than the smaller ones.

11. A method according to claim 1, characterised by the formation of locking elements (17) after pressing in such a manner that the steering rod guide elements (4a, 4b) are fixed to an abutting housing inner wall at least in the direction of release or withdrawal.

12. A method according to claim 11, characterised in that the locking elements are formed by at least one from a group consisting of joining welds and plastic deformation of adjacent wall faces of the housing end regions and the steering rod guide elements in order to form meshing points with one another.

13. A method according to claim 12, characterised by the use of a punch with one or more round heads for forming the meshing region.

14. A method according to claim 1, characterised in that in order to fix the rack-and-pinion steering housing to the chassis of a vehicle, a U-shaped holding plate formed by bending is welded to at least one end region of the rack-and-pinion steering housing.

* * * * *